June 6, 1939.  H. K. BIGELOW  2,161,125
MOTOR VEHICLE BRAKE SHOE REFINISHER
Filed March 8, 1937   2 Sheets-Sheet 1
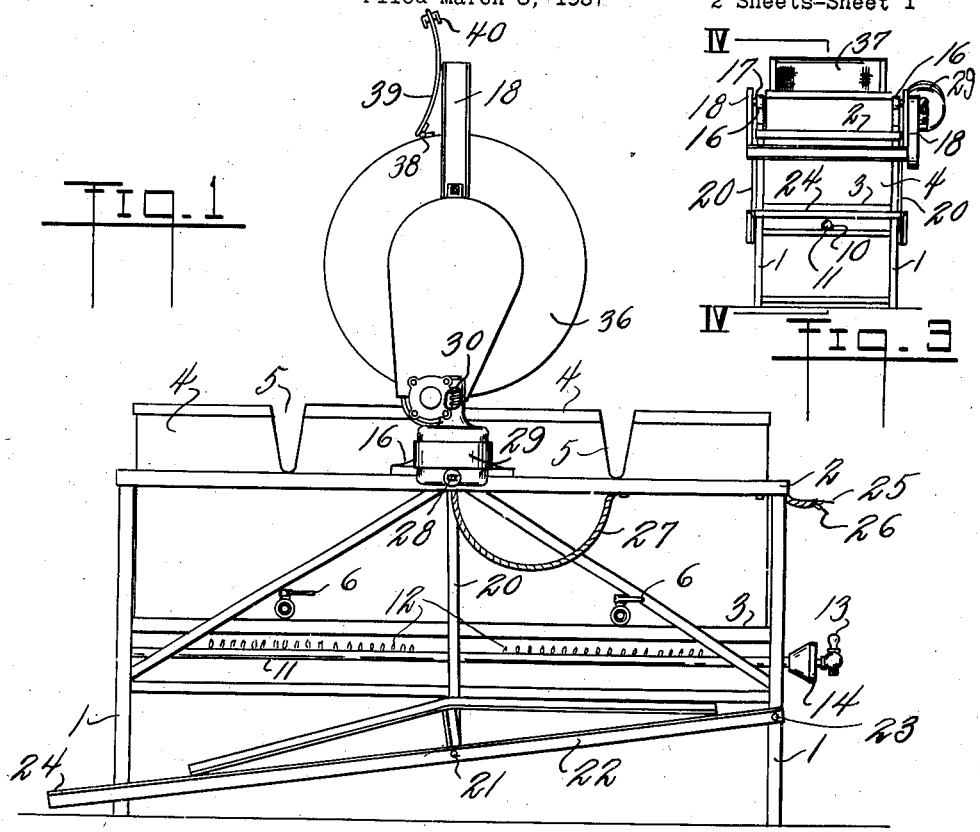
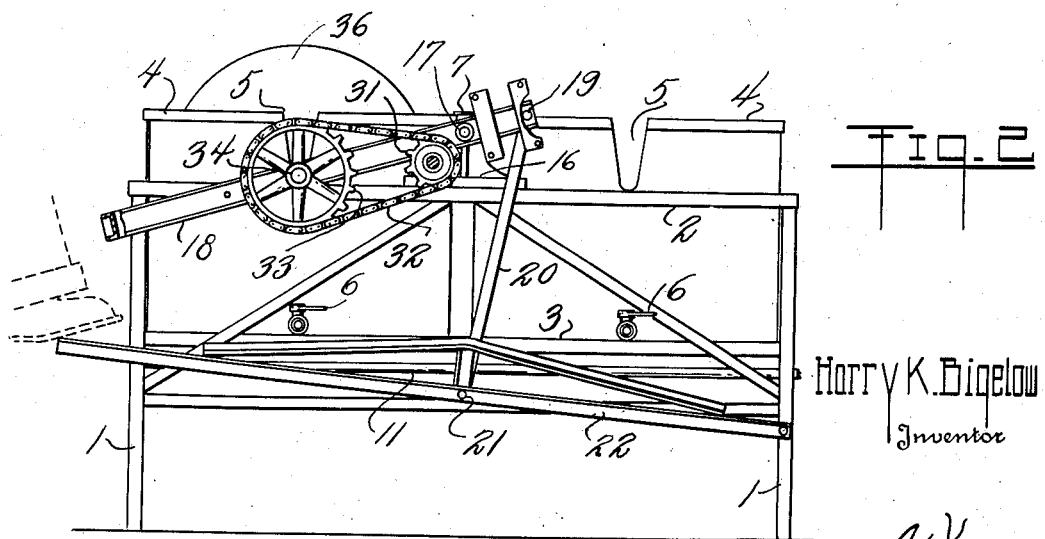
Harry K. Bigelow
Inventor
By
Attorney June 6, 1939. H. K. BIGELOW 2,161,125
MOTOR VEHICLE BRAKE SHOE REFINISHER
Filed March 8, 1937 2 Sheets-Sheet 2
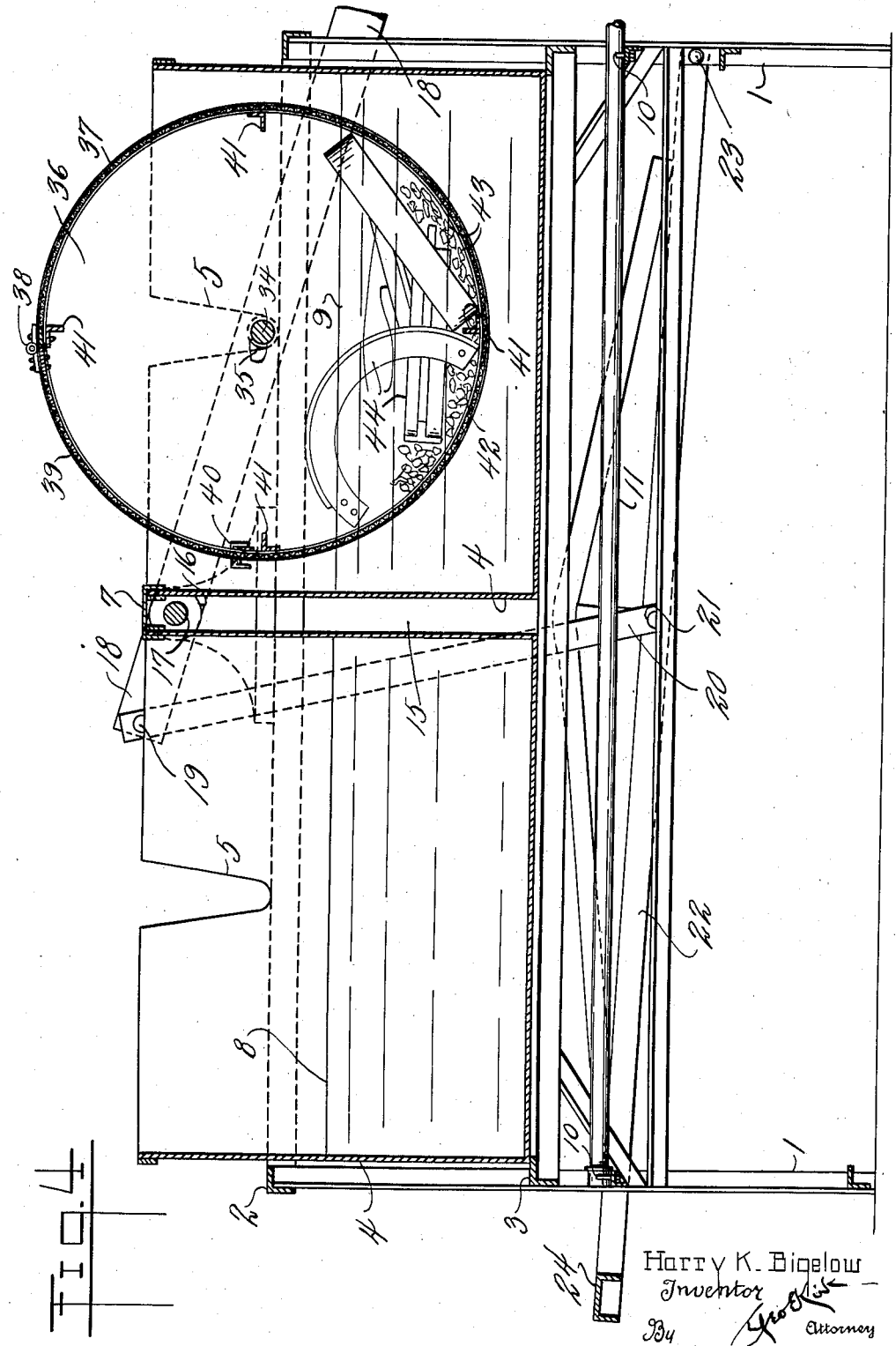

Patented June 6, 1939

2,161,125

UNITED STATES PATENT OFFICE 2,161,125

MOTOR VEHICLE BRAKE SHOE REFINISHER

Harry K. Bigelow, Columbus, Ohio

Application March 8, 1937, Serial No. 129,668

4 Claims. (Cl. 51—164)

This invention relates to processing in the nature of finishing or re-finishing as the surfaces of metal parts.

This invention has utility when incorporated in re-conditioning brake shoes of motor vehicles.

Referring to the drawings:

Fig. 1 is a side elevation of an embodiment of the invention with the drum elevated and open as in charging position;

Fig. 2 is a view similar to Fig. 1, with the drum in lowered or operation position, the gear chain housing removed, and the motor part broken away;

Fig. 3 is an end elevation of the machine from the left of Fig. 2; and

Fig. 4 is a section on the line IV—IV, Fig. 3, but with the drum in rinsing position.

Angle uprights 1 carry upper angle frame 2 and thereblow angle frame 3. The frame 3 provides support for vessels or tubs 4 having notched sides 5 in approximate transverse register. These respective tubs or vessels 4 may be provided with drain cocks 6 in position in the frame 2; and as mounted on the frame or seat 3, these vessels 4 may be spaced and have shield or U-clip 7 for the spanner therebetween, and one of said vessels 4 may contain solution 8, say as a solvent for grease, and the companion vessel 4 may have liquid 9, say as rinse water.

Clips 10 are disposed below the seat 3 to locate pipe 11 as a heater or gas burner slightly below the bottoms of these metallic tubs or vessels 4 for play of gas jets 12 thereon, which heating action may be adjusted by valve 13 adjacent air mixer 14. Adjacent clearance region 15 between the two vessels 4, as removably mounted in the frame, bearings 16 locate shaft 17 as a mounting for U-channel 18. It is convenient to adopt weld assembly for the frame and parts herein.

This U-channel 18 has its forks extend beyond the shaft 17 and are there provided with pivot pins 19 connecting link 20 by pivot pin 21 in lever 22, having fixed fulcrum 23 at one end of the frame and extending as a U-shaped treadle 24 about the frame remote from the pivot bearings 23. Downward pressure on the treadle 24 tends to rock the U-frame 18 on the shaft 17 as a fulcrum, notwithstanding the drive counterweight.

Electric conductor lines 25, 26, are in conduit 27 carried conveniently in the frame, and extend to switch 28 at motor 29, having speed reduction drive 30 to pinion 31 having sprocket chain 32 as further speed reduction to sprocket 33 on stub shaft 34 extending through sleeve 35, fixed with the arm 18. The sleeve 35 rests in the bottom of the notch 5 on one side, while similar sleeve fixed with the channel 18 rests in the sleeve 35 on the opposite side, and there carries stub shaft companion to this shaft 34. These stub shafts mount drum therebetween comprising disks 36 fixed with the drive shaft 34. These parallel disks 36 have therebetween foraminous shell or screen 37, with hinge 38 for door section 39 which may be held closed by latch 40. Spacing the disks 36 and adjacent the screen 37 are transverse bars or angles 41 which provide lifting means during the drum rotation, not only for pebble fragments 42 but punchings and iron or steel fragments 43, which may have rumbling action relative to the articles of work 44 as automobile or motor vehicle brake shoes, that such may be rumbled to remove irregularities as well as corrosion and have a smooth finish imparted thereto.

In this operation for charging the drum with these articles, such in practice may be in quantity, first as exposed to solvent solution 8 as rotated at such a rate of speed that the solvent will work into and out of the drum do not be materially lifted by the drum action above its level, which is slightly below that of the shaft 34.

By such a relatively slow speed for rotation, notwithstanding the rotation is continuous in one direction, the machine parts as lifted by the cleats 41 fall back not only against themselves but have the stones and steel parts strike and hammer thereagainst in effecting further abrasive action in clearing up the charge. This means that with a drum twenty inches in diameter and eighteen inches long rotated at say 15 R. P. M. and with one inch cleats 41, effective clearing up of worn motor vehicle brake shoes may be had in ten or fifteen minutes when the charge may be of as many as forty brake shoes. While there may be cleaning occur in as brief a period as six minutes, when the charges run from ten to fifteen minutes, such period is accurately the time required by the operator to prepare the following charge of shoes for this conditioner.

As the rumbling and solvent washing action has occurred, say in the solution 8, the attendant may depress the treaddle 24 and by quick action shift the drum; but notwithstanding the load of the charge in the drum, the carry-over may be past the dead point for settling the drum in the notches 5 of the companion vessel approximately against the rail 2 for rinsing action in the water 9. With the burner jets 12 warming the treating liquids there is promoted the efficiency of operation hereunder. The perforations and the drum may be sufficient that the foreign particles removed from the work may be in the solution and draw off may be had as desired at the drains 6 and replenishment taken to maintain the desired solvent strength and rinsing effectiveness.

For bringing the drum to charging position, instead of quick action for throw-over from one vessel or tub to the other, the treadle 24 may be gradually depressed to bring the motor down and the drum up, at which point the lid 39 may be swung to open position and the clean charge of brake shoes 44 removed from the drum and replaced by supplemental charge for repetition of this cycle of operation.

What is claimed and it is desired to secure by United States Letters Patent is:

1. A frame, a plurality of vessels fixed in position by the frame, a drum movably carried by the frame to shift into different vessels, and a drum rotating drive independent of the vessels and frame.

2. A frame, a pair of vessels positioned by the frame, a drum, a pivotal mounting for the drum on the frame between the vessels, a control on the frame for shifting the drum from one vessel to the other, and a drive for the drum fixed with the drum.

3. A frame, a plurality of vessels mounted in position by the frame, a drum adapted to be located in cooperation with different vessels, and drive means for rotating the drum as in position with the frame.

4. Equipment for cleaning irregularities from surfaces of material, said equipment embodying a frame, bath-providing containers mounted by the frame, a foraminous drum mounted for partial submergence in the different containers by shifting from one to another thereof, and a drive for rotating the drum as to the container in which located in thereby promoting bath operation.

HARRY K. BIGELOW.